United States Patent [19]
Mastromonaco

[11] Patent Number: 5,222,322
[45] Date of Patent: Jun. 29, 1993

[54] INSECT CAPTURE AND EXTERMINATION SYSTEM

[76] Inventor: Joseph D. Mastromonaco, 696 Avenue C, Bayonne, N.J. 07002

[21] Appl. No.: 874,958

[22] Filed: Apr. 27, 1992

[51] Int. Cl.$^5$ ............................................. A01M 1/06
[52] U.S. Cl. ...................................................... 43/139
[58] Field of Search .................................. 43/113, 139

[56] References Cited

U.S. PATENT DOCUMENTS

| | | | |
|---|---|---|---|
| 1,885,854 | 11/1932 | Montellano | 43/139 |
| 2,569,722 | 10/1951 | Knox | 43/139 |
| 2,777,934 | 1/1957 | Falkenthal | 43/139 X |
| 2,893,161 | 7/1959 | Reid | 43/113 |
| 4,127,961 | 12/1978 | Phillips | 43/139 |
| 4,856,226 | 8/1989 | Taylor | 43/113 |
| 5,052,147 | 10/1991 | Broomfield | 43/139 |

*Primary Examiner*—Richard K. Seidel
*Assistant Examiner*—Kenneth S. Hansen
*Attorney, Agent, or Firm*—M. K. Silverman

[57] ABSTRACT

An insect capture extermination system provides a hollow fluid-type housing having an intake channel. A negative pressure assembly secured within the housing is actuated by a proximity sensor which detects insects at the entrance to the intake channel. Also provided is an inner flow permeable membrane which provides particulate barrier to both protect the negative pressure assembly and to capture and store insects between cleaning of the system. Insects are attracted to an insect attraction element, such as sonic, olfactory and phosphoric elements, and pulled into the intake channel of the housing and captured. The system may be adapted for use with food display counters and in residential structures. A proximity sensor maintains the system in a normally-off mode in the absence of insect activity at the intake channel.

7 Claims, 2 Drawing Sheets

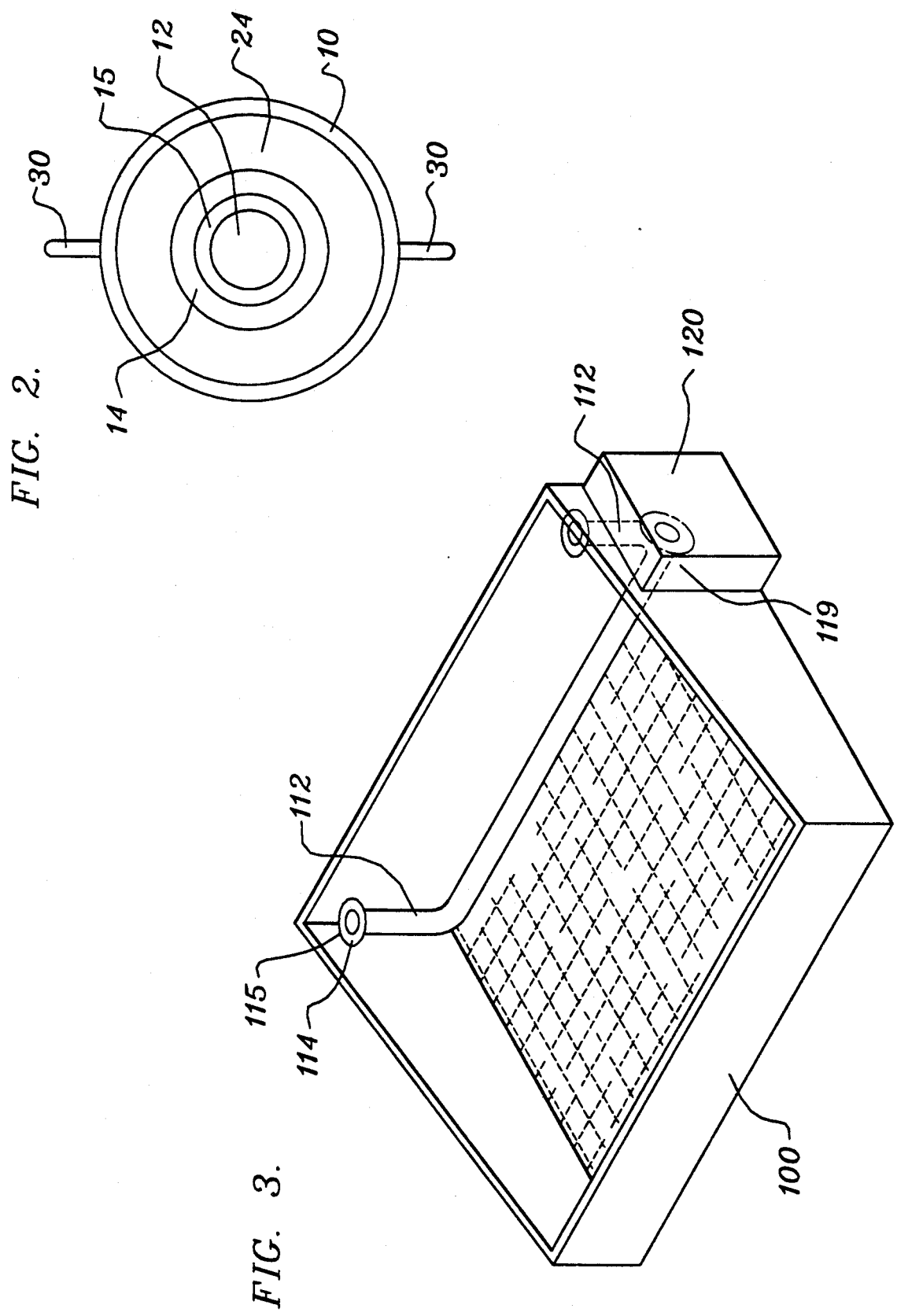

INSECT CAPTURE AND EXTERMINATION SYSTEM

BACKGROUND OF THE INVENTION

The capture and extermination of insects has been a problem that is as old as civilization itself.

Efforts to solve this problem have ranged from the use of physical means such as fly swatters to the use of chemical means in the nature of poisons, to the use of electronic means such as a particular radio frequencies which are damaging to insects.

The present invention seeks to take advantage of aspects of all of the above insect extermination means, however, placed within a broader context such that many environments that are impacted upon by insects can be protected.

More particularly, the instant invention relates to the use of vacuum means in insect capture. Prior art in this area particularly relevant to the invention includes U.S. Pat. Nos. 1,071,620 to Kingsland, 1,885,854 to Montellano; and 4,074,458 to Catlett.

The instant invention also relates to a means for insect capture and extermination in areas in which food and other comestible materials are displayed or utilized without the use or prior art means which are either or both unsightly or which could contribute to contamination of food or food products. Prior art in this area known to the inventor is U.S. Pat. No. 2,569,722 to Knox, entitled Vacuum Insect Eradication Device for Showcases.

SUMMARY OF THE INVENTION

The instant invention relates to an insect extermination system comprising a hollow fluid-tight housing having an intake channel, negative pressure means, in the nature of vacuum means secured within said housing, an air flow permeable membrane defining a particulate barrier for said intake channel and other interior portions of said hollow housing, said membrane defining a particulate screen, and, at an entrance to said intake channel, insect attraction means and a proximity sensor. Such attraction means may be in the nature of phosphoric, olfactory, sonic, or radio frequency. By such means, the insect is attracted to an entrance to said intake channel, and said negative pressure means will pull the insect into said particulate screen thereby capturing the insect. The proximity switch maintains the system in an off mode when there are no insects in the vicinity of the intake channel. The system can thereby be used without human intervention.

It is therefore an object of the present invention to provide an improved means of insect capture and extermination.

It is another object of the present invention to provide an insect capture and extermination means which may be incorporated into an existing food storage or display assembly.

It is a yet further object of the present invention to provide a portable system for insect capture and extermination.

The above and yet other objects and advantages of the present invention will become apparent from the hereinafter set forth Brief Description of the Drawings, Detailed Description of the Invention, and Claims appended herewith.

BRIEF DESCRIPTION OF THE DRAWINGS

FIG. 2 is an axial view taken along Line 2—2 of FIG. 1.

FIG. 3 is a schematic view of the instant invention showing its location within a food display counter.

DETAILED DESCRIPTION OF THE INVENTION

Figure 1:
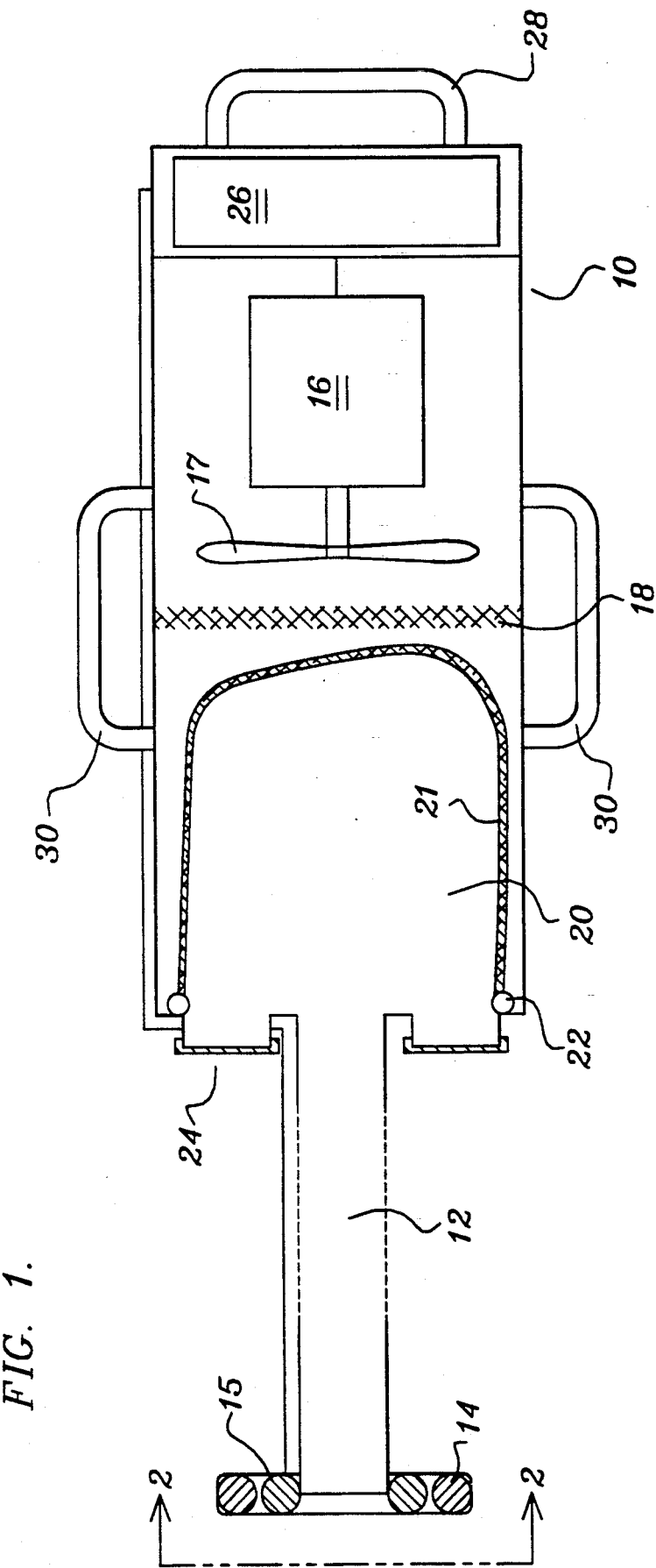
FIG. 1 is cross-sectional view of a hand-held portable embodiment of the instant invention.

With reference to FIGS. 1 and 2, a first embodiment of the present inventive system is seen to include a hollow fluid-tight housing 10. In integral fluid communication therewith is an intake channel 12 which, at the entrance thereof, is circumferentially surrounded by insect attraction means 14. Such means may take the form of an insect attracting phosphor, insect attracting lights, an insect attracting chemical, or electronic means for generating an insect-attracting radio or sonic frequency. Means of all of the above types are well known in the art.

Disposed annularly within attraction means 14 is a proximity sensor 15, the function of which is to maintain a vacuum motor 16 in a normally off state in the absence of insects near the entrance to the intake channel 12. Proximity sensors suitable for use as said sensor 15 include (a) inductive proximity sensors the functionality of which is described in U.S. Pat. No. 5,012,202; (b) capacitative sensors, the functionality of which is described in U.S. Pat. No. 4,950,084; (c) light emitting proximity sensors, the functionality of which is described in U.S. Pat. No. 4,564,756; (d) mageneto acoustic proximity sensor, the functionality of which is set forth in U.S. Pat. No. 4,709,210; and (e) so-called vortex proximity sensors, the functionality of which is set forth in U.S. Pat. No. 3,712,318. It is noted that proximity sensors include, as a subset thereof, motion detectors.

Within housing 10 is provided a negative pressure means, namely, said motor 16, as is shown in FIG. 1, which includes a fan 17. To the left of the fan of vacuum motor 16 is an air and insect filter 18.

Shown to the left of filter 18 is an air flow permeable membrane which defines a particulate barrier 20, the purpose of which is to catch insects which are sucked into the structure through intake channel 12 but, however, to enable the flow of air through to the vacuum motor 16. Said particulate barrier 20 is detachably attached to the interior of housing 10 through snap-release elements 22. As another mode of removing collected insects from barrier 20, there are provided snap release elements 24 which, when removed, permit ready removal of collected insects from barrier 20.

Further provided in the embodiment of FIGS. 1 and 2 is a battery 26, the purpose of which is to provide power to vacuum motor 16.

Also shown in the view of FIG. 1 are gripping means 28 and 30 which afford ease of holding and engagement of the housing 10 by the human hand. It is to be appreciated that the housing and the components thereof may be made of lightweight plastics such that the resulting unit will have approximately the dimensions of a search light and can be operated by two or three D-size batteries.

Further, by virtue of the use of proximity sensor 15, the entire unit may be suspended by its gripping means 28 and 30 without any need for human intervention.

With reference to FIG. 3, there is shown a food enclosure 100 in the nature of a display case or cabinet in which food products are stored and displayed. Typically, such an enclosure would be a meat counter at a meat shop or a pastry counter in a bakery. However, it is to be appreciated that other food display applications may fall within the scope of the present invention. Further shown in the embodiment of FIG. 2 are intake channels 112 which, as in the case of the embodiment of FIG. 1, are provided with insect attraction means 114 and proximity sensor 115.

Shown in schematic, to the right of enclosure 100, is fluid-tight housing 120. Therewithin, but not shown in FIG. 3, are negative pressure means in the nature of a vacuum suction motor and fan and particulate barrier, comparable to barrier 20, described with reference to the embodiment of FIG. 1. It is to be appreciated that the contents of housing 120 need not necessarily be disposed within or upon assembly 100 but, rather, may be integrated into a wall, floor, or other parts of the building in which the present invention is employed. For example, a vacuum-carrying piping could be employed with-in the internal structure of a food or supermarket such that units, such as that shown in FIG. 3, could be plugged in to vacuum piping at point 119 of channels 112.

Similarly, in a residential dwelling, many of which are already provided with vacuum piping outlets, units, such as that shown in either FIG. 1 or 3, could simply be plugged into such a system for either portable or non-portable use in a variety of applications.

Accordingly, while there has been shown and described the preferred embodiment of the present invention it is to be appreciated that the invention may be embodied otherwise than is herein specifically shown and described and that, within said embodiment certain changes may be made in the form and arrangement of the parts without departing from the underlying idea or principles of the invention as set forth in the Claims appended herewith.

Having thus described my invention what I claim as new, useful and non-obvious and, accordingly, secure by Letters Patent of the United States is:

1. An insect extermination system, comprising:
   (a) a food display and containing structure defining, integrally therewithin, a plurality of fluid-tight intake channels;
   (b) negative pressure means in fluid communication with said intake channels;
   (c) an air flow permeable membrane defining a particulate barrier between said intake channel and an interior enclosure in fluid communication with said intake channel, said membrane defining an insect enclosing means; and
   (d) at an entrance to each of said intake channels, insect attraction means and a proximity sensor in electrical communication with said negative pressure means, in which said proximity sensor is actuated by the presence of insects thereat,
   whereby insects attracted to said attraction means are pulled into said intake channels by suction from negative pressure at entrances to said intake channels.

2. The system as recited in claim 1 in which said insect attraction means comprises phosphoric insect attraction means.

3. The system as recited in claim 1 in which said insect attraction means comprises sonic insect attraction means.

4. The system as recited in claim 1 in which said insect attraction means comprises olfactory attraction means.

5. The system as recited in claim 1 in which said negative pressure means is situated within the walls of a structure within which said system is to be used.

6. The system as recited in claim 5 further comprising flexible conduit means from said negative pressure means to said hollow housing.

7. The system as recited in claim 5 in which said proximity sensor comprises a motion detector.

* * * * *